Nov. 25, 1952  H. KIHN  2,619,537
HIGH-FREQUENCY DELAY DEVICE
Filed July 28, 1950
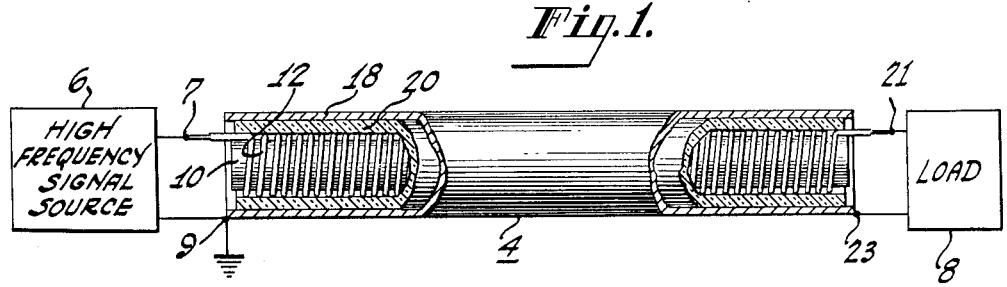
Fig. 1.
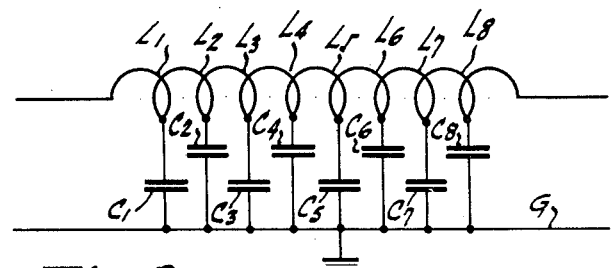
Fig. 2.
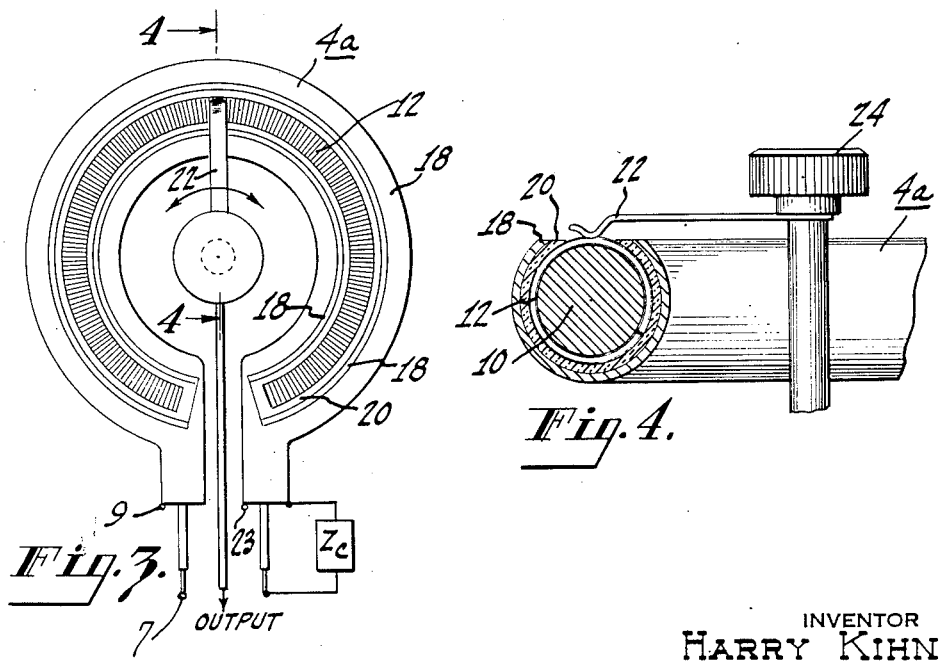
Fig. 3.
Fig. 4.
INVENTOR
HARRY KIHN
BY
ATTORNEY Patented Nov. 25, 1952

2,619,537

UNITED STATES PATENT OFFICE 2,619,537

HIGH-FREQUENCY DELAY DEVICE

Harry Kihn, Lawrenceville, N. J., assignor to Radio Corporation of America, a corporation of Delaware Application July 28, 1950, Serial No. 176,324

2 Claims. (Cl. 178—44)

This invention relates to improvements in delay devices for high frequency signaling systems, and particularly to an improved device for obtaining a large amount of time delay in the transmission of a high frequency signal between two relatively closely spaced points.

In high frequency signaling circuits, such as in television transmitting and receiving systems, for example, it is sometimes necessary to pass a signal through two or more channels simultaneously and to delay the signal in one or more of the channels in order to obtain a desired phase or time relation between the signals in the different channels. Similarly, in pulse-type signaling systems, it is frequently necessary to delay a pulse by an adjustable amount for accurate measurement of time intervals or the like.

It is, of course, well known that a finite time is required for an electrical signal to pass along a transmission line. However, the physical dimensions of ordinary transmission lines are quite large, especially for signals at the lower end of the high frequency spectrum, precluding the use of such lines in many instances. It has, therefore, been proposed to use artificial transmission lines for delay purposes, the electrical constants of an ordinary line being concentrated or "lumped" to reduce physical dimensions. Further, it has been proposed to provide sections of such lines with a movable output contact element, so that the distance between the input terminals and the output contact can be varied to select any desired amount of delay.

One of the principal difficulties encountered in prior art devices of this type is that they do not have sufficient delay per unit length to permit their use in units where space is at a premium. Moreover, such devices often are relatively complex and difficult to manufacture.

It is a general object of the present invention to provide an improved high frequency signal delay device.

Another object of the invention is to provide a simple and highly efficient signal delay device utilizing a section of artificial transmission line.

A further object of the invention is to provide a novel form of artificial transmission line having unusual signal delay characteristics.

Another object of the invention is to provide an adjustable signal delay device of compact form.

In accordance with the invention, the foregoing and other related objects and advantages are attained by providing a two-conductor artificial transmission line wherein one conductor comprises a coil wound on a magnetically permeable core. The other conductor comprises a conductive member or members spaced from and partially or entirely surrounding the coil so as to be in capacitive relation therewith. In a preferred embodiment of the invention, a contact member movable over an exposed surface of the coil provides means for selecting any desired amount of delay of an electrical signal passed through the device.

A more complete understanding of the invention can be had by reference to the following description of illustrative embodiments thereof, when considered in connection with the accompanying drawing, wherein:

Figure 1 is a diagrammatic representation of a section of artificial transmission line constructed in accordance with the invention and connected in a high frequency signaling system, Figure 2 is a schematic diagram of the electrical circuit equivalent to the section of artificial transmission line shown in Figure 1.

Figure 3 is a plan view of a variable delay device constructed in accordance with the invention, and Figure 4 is a cross-sectional view taken on the line 4—4 of Figure 3.

Referring to Fig. 1 of the drawing, a section of artificial transmission line 4 embodying the principles of the invention is shown connected between a signal source 6 and a load 8. The line section 4 is built up around a core 10 of magnetically permeable material. The core material is one which preferably has relatively high magnetic permeability, such as so-called "ferrite" material (i. e. a homogenous crystalline compound comprising the reaction product of iron oxide and at least one other metallic oxide) or the like, although the use of an ordinary iron core is considered to be within the scope of the invention.

Wound on the core 10, and insulated therefrom, is a coil 12 consisting of a plurality of turns of wire insulated from each other and from the core 10, as by an insulating covering of enamel or the like.

A conductive member 18 of copper, brass or the like surrounds the coil 12 and core 10 throughout the length thereof. The conductive member 18 is spaced from the coil 12, and the space therebetween preferably is filled with material 20 having a relatively high dielectric constant, such as polystyrene or the like, in order to increase the distributed capacity between the coil 12 and the conductive member 18.

The signal source 6 is connected to the line 4 at a pair of input terminals 7, 9. One of the input terminals, 7, is connected to one end of the coil 12 and the other input terminal, 9, is connected to an adjacent end of the conductive member 18 which may be grounded, as shown in Fig. 1. The load 8 is connected to the line 4 at a pair of output terminals 21, 23. One of the output terminals, 21, is connected to the remaining end of the coil 12, and the other output terminal 23 is connected to the conductive member 18.

In Fig. 2, there is shown the equivalent electrical circuit of the delay device of Fig. 1. In Fig. 2, the coil turns $L_1 \ldots L_8$ correspond to individual turns of the coil 12 of Fig. 1, and the ground line G in Fig. 2 corresponds to the conductive member 18 in Fig. 1. The capacitors $C_1 \ldots C_8$ in Fig. 2 represent the distributed capacity between the coil 12 and the member 18 of Fig. 1.

It can be shown that the velocity V of propagation of a voltage wave along a transmission line is given by the expression $$V = \frac{1}{\sqrt{LC}}$$

where L is the inductance in henries per unit length and C is the capacity in farads per unit length. Therefore, it can be seen that the greater the inductance and capacitance per unit length of a line, the lower the velocity of propagation will be. In the construction shown in Fig. 1, the permeable core 10 greatly increases the inductance of the coil 12, and the dielectric material 20 provides relatively high capacity per unit length between the coil 12 and the conductive member 18. For example, with the construction shown in Fig. 1, it is possible to obtain, in a four inch section of line, a time delay equivalent to a 3000 inch section of ordinary parallel line or coaxial transmission line.

The exact configuration of the delay device will depend on the space limitations and other physical characteristics of the installation in which the delay device is to be used. For example, the delay device can be made in the shape of a ring and provided with a rotatable contact member, as shown in Figs. 3 and 4. In these figures, a ring shaped section of artificial line 4a is shown which comprises a permeable core 10, coil 12, and conductive member 18 generally similar to the line 4 of Fig. 1. In Figs. 3 and 4, however, the member 18 only partially surrounds the coil 12 and core 10, leaving a portion of the coil 12 exposed throughout the length of the core. The insulation is removed from the coil wire where the latter is exposed by the member 18, and an output contact member 22, rotatably mounted at the center of the ring 4a, is arranged to contact the exposed portion of the coil 12. A knob 24 or the like may be provided for rotating the contact member 22.

A pair of input terminals 7, 9 connected to one end of the coil 12 and the conductive member, 18, respectively, is adapted to be connected to a signal source (not shown). The other end of the line 4a preferably is terminated in an impedance $Z_c$ equal to the characteristic impedance of the line 4a in order to avoid standing waves or the like. The output is taken between the movable output contact 22 and a contact 23 connected to the member 18. By setting the contact member 22 at different points along the line 4a, signals from the source can be delayed by any desired amount within the limits of the total line delay available.

It will be understood that the invention is not limited to the specific details of construction set forth herein. For example, the conductive member 18 need not necessarily be continuous, but may consist of conductive strips in capacitive relation with the coil 12. Since this and other similar modifications can be made in the device shown and described, all within the scope and spirit of the invention, the foregoing is to be construed as illustrative, and not in a limiting sense.

What is claimed is:

1. A delay device for delaying the transmission of a high frequency electrical signal between a pair of input terminals and a pair of output terminals, said device comprising an artificial transmission line including a ring-shaped core member of magnetically permeable material, a coil wound on said core and insulated therefrom and connected at one end to one of said input terminals, conductive means partially surrounding said coil and core member in spaced capacitive relation to said coil so as to leave a portion of said coil exposed throughout the length of said core, said conductive means being connected to the other of said input terminals and to one of said output terminals, and a contact member connected to the other of said output terminals and movable along said exposed coil portion in contact therewith.

2. A delay device as defined in claim 1 including a load impedance equal to the characteristic impedance of said transmission line connected between said conductive means and the other end of said coil.

HARRY KIHN.

REFERENCES CITED

The following references are of record in the file of this patent:

UNITED STATES PATENTS

| Number | Name | Date |
|---|---|---|
| 2,158,493 | Brailsford et al. | May 16, 1939 |
| 2,387,783 | Tawney | Oct. 30, 1945 |
| 2,467,857 | Rubel et al. | Apr. 19, 1949 |